Patented Apr. 25, 1944

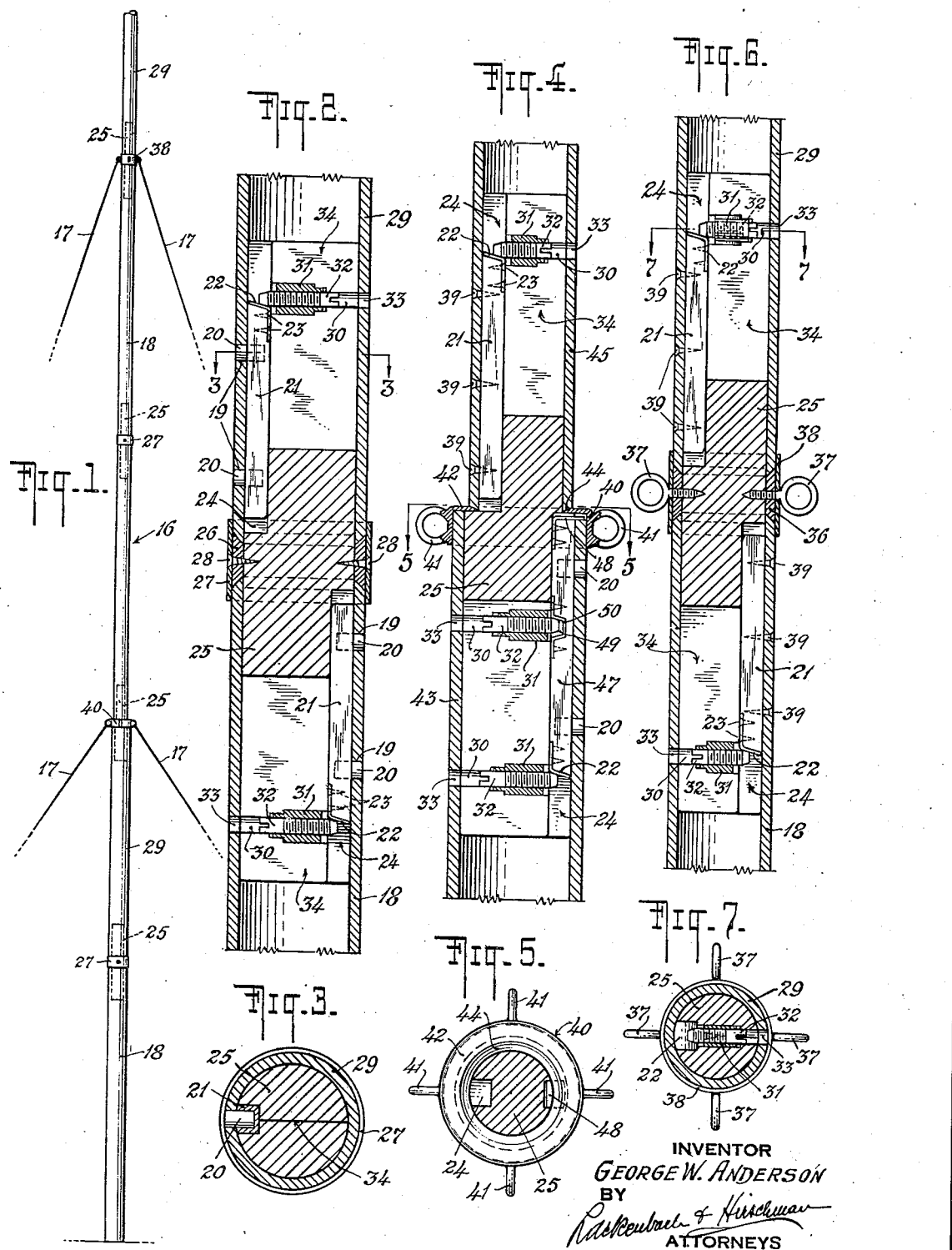

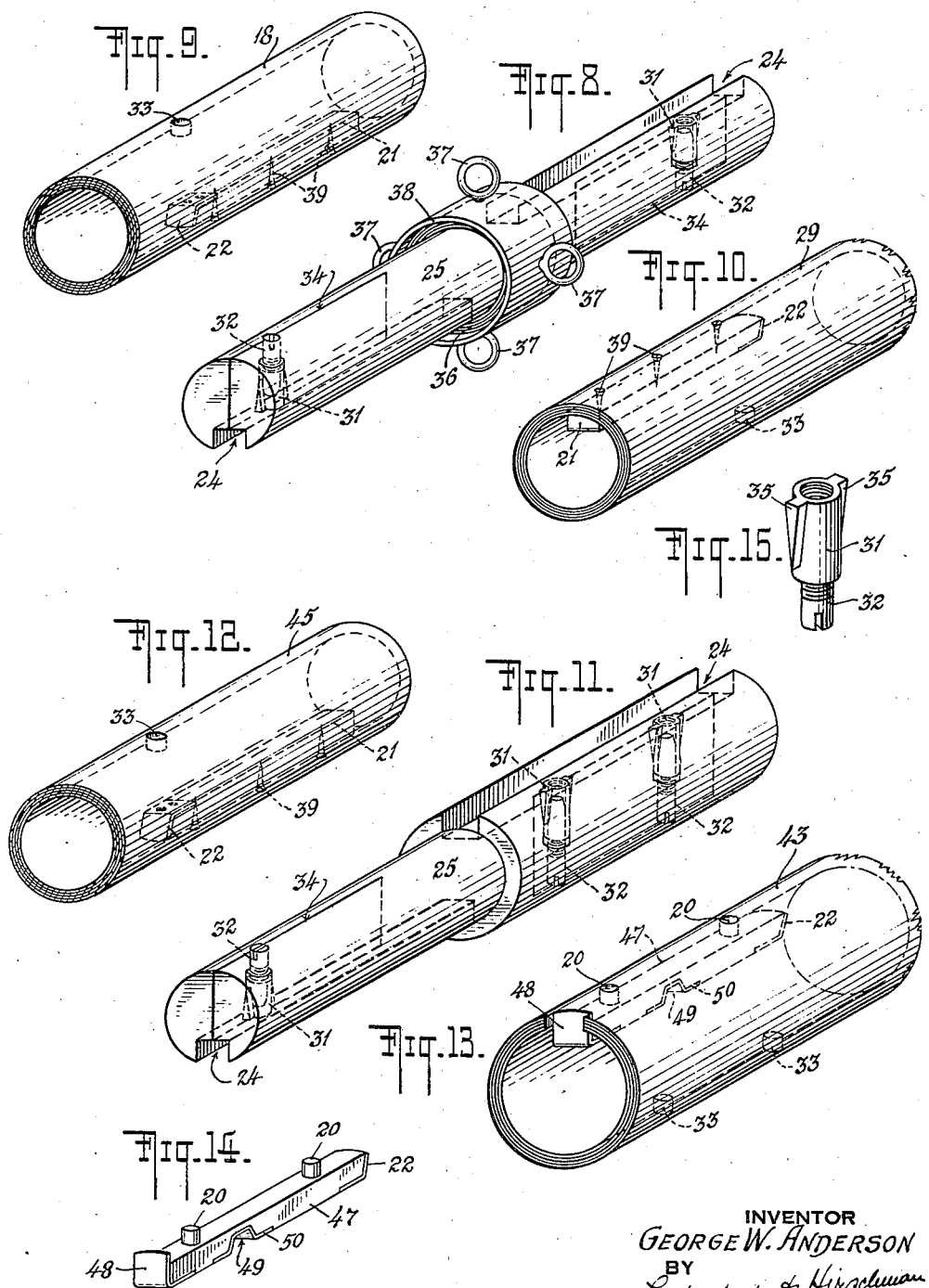

2,347,534

UNITED STATES PATENT OFFICE 2,347,534

CYLINDRICAL COUPLING FOR HOLLOW TUBING

George W. Anderson, Port Washington, N. Y., assignor to United States Plywood Corporation, New York, N. Y., a corporation of New York Application November 24, 1942, Serial No. 466,731

11 Claims. (Cl. 287—127)

The invention relates to a substantially cylindrical coupling of laminated or solid wood construction capable of utilization for rigidly joining together two or more lengths of hollow tubing of the same or different diameters, sections of such hollow tubing, connected by my novel coupling device, producing a readily erectible mast suitable for a variety of uses, for instance, as a mast for radio antenna, a flag pole, a mast for sailboats, etc.

One of the objects of the invention is to provide a coupling device of wood, or other light material suitable for binding together a plurality of lengths of hollow tubing which are to constitute the sections of a built up mast or pole which coupling is so constructed that it is capable, with facility and dispatch, of being applied to serve its intended function and which when positioned, with a very few and simple operative steps, for effecting the joining of sections of hollow tubing, will produce a mast or pole structure of extreme rigidity, and yet permit the ready disassembling of the sections of hollow tubing for dismantling of the mast and the re-assembling of its component parts at some other location.

An ancillary object of the invention is to provide means for erecting a readily portable mast constituted of a plurality of sections of hollow tubing, the over-all weight of the sections and coupling members being substantially less than a solid mast of substantially equal dimensions.

A more particular object of the invention is to provide such cylindrical coupling of various designs and constructions particularly adapted for connecting adjoining sections of a plurality of hollow tubes constituting such mast, one form of the coupling being designed for connecting two adjacent sections which are of equal diameter and another form of the coupling being designed to connect adjacent sections which are of different diameters.

A still further object of the invention is to provide such coupling of a construction which permits, by reason of the removability of the key or connecting elements thereof, the clustering or nesting of one section of the hollow tubing into another section of larger diameter.

A still further object of the invention resides in the provision of certain details of construction in the structural elements of the coupling to permit expansion of the coupling body upon assembly thereof with adjoining sections of the hollow tube, to secure a rigid joint between the tube sections and between the coupling body and adjoining tube surfaces.

Certain other features of construction of my novel coupling device provide a longitudinal and lateral tightening of the connecting plug or coupling within the adjoining hollow mast sections. Thus, in accordance with the novel construction, my coupling device is effective to lock the two adjoining ends of two tube sections together by a two-way jamming action holding the edges of the tubes in tight frictional alignment and taking up the slight disparity between the outside diameter of the coupling and the inside diameter of the joined tube sections.

The important feature of my invention, therefore, is the provision of means for securing a two-way locking action between the coupling body and the joined tube sections, this two-way locking action being effected by means of a lateral thrust of a set screw jamming the cylindrical coupling against the inside wall of the tube section and a sliding end thrust of the set screw forcing the end of one tube against the adjacent tube through the intermediary of a center band provided along the periphery of the coupling and against the end surfaces of which the two connecting tube sections are adapted to abut.

In its broadest aspects, my invention resides in the provision of a coupling comprising a cylindrical length of laminated or solid wood with a narrow band at the center constituting an extension of the diameter of the cylinder at its center, which narrow band is of a width equal to the thickness of the wall of the tube sections to be coupled together. Keyways extending in the surface of the coupling, from the band to the ends of the coupling on opposite sides of its peripheral surface, are provided to receive keys either permanently or detachably secured to the interior surfaces of the hollow tube sections at corresponding points along such hollow tube sections.

Thus, the coupling of the present invention, which is an integral part of the mast section, serves as an internal anchor permitting a positive union of two mast sections through the medium of a single, unitary, coupling. This union is enhanced effectively by reason of a two-way expansion thrust; first, laterally against the internal wall of the mast section to compensate for the slightly smaller diameter of the coupling; second, an end thrust is achieved through a sliding action of a set screw along the bevel of the key. This action tends to bring the two ends of the mast sections in firm contact. The provision of keyways also serves to line up the coupling with the set screw holes in the mast sections, permitting assembly by sense of touch, at night, if necessary.

Particular embodiments of my invention are illustrated in the accompanying drawings. The two specific embodiments constitute a coupling construction for joining two adjacent hollow tube sections of like diameter and another embodiment constituting a coupling for joining adjacent hollow tube sections of different diameters. Various structurally differing connecting members to effect certain results, for instance, the nesting of hollow tube sections of different diameter, the smaller into the larger, by the provision of keys removable from the interior surface of one hollow tube section in order to provide space therein for receiving another tube section of smaller diameter, are also illustrated and described.

In the drawings, Fig. 1 illustrates a hollow mast constituted of a plurality of sections of hollow tubing joined together in accordance with my invention, four of such complete hollow sections being shown by way of illustration although any number of such hollow sections, as many as ten or twelve, to constitute a mast of between 70 and 80 feet in height with the hollow sections approximately 11 feet long, being capable of being joined together by means of my novel coupling devices.

Fig. 2 is a vertical section through portions of two adjacent hollow tube sections of equal diameter joined together by my novel coupling device; Fig. 3 is a section along the line 3—3 of Fig. 2; Fig. 4 is a vertical section through the adjoining portions of two hollow tube sections connected by my coupling where the adjoining hollow tube sections are of different diameters; Fig. 5 is a section along the line 5—5 of Fig. 4; Fig. 6 is a vertical section through the adjoining parts of two adjacent hollow tube sections of equal diameter, the coupling thereof being substantially of the same construction as that of Fig. 2, except that the keys are permanently secured to the interior surfaces of the hollow tube sections and with a slightly modified form of a band section providing rings for the securement of guy wires thereto; Fig. 7 is a section along the line 7—7 of Fig. 6.

Fig. 8 is a perspective view of a cylindrical coupling of the first embodiment, i. e., the one in which two hollow tube sections of equal diameter are to be joined; Fig. 9 is a perspective view of a portion of a hollow tube section having permanently secured to the interior surface thereof, the key by means of which the securing coupling operates; Fig. 10 is a perspective view of a portion of the other of the adjacent hollow tube sections which is to be connected to the tube section of Fig. 9 by the coupling of Fig. 8.

Fig. 11 is a perspective view of a cylindrical coupling constructed in accordance with my invention and suitable for connecting adjacent tube sections of different diameters; Fig. 12 is a portion of one of the tube sections, i. e., that of smaller diameter to be connected by the coupling of Fig. 11; Fig. 13 is a perspective view of a portion of the other adjacent larger diameter tube section which is to be joined to the tube section of Fig. 12 by the coupling of Fig. 11.

Fig. 14 is a perspective view of one of the detachable keys which is to be inserted into the keyways of the coupling after the key has been secured to the interior surface of the hollow tube section; Fig. 15 is a perspective view of an internally threaded sleeve having external wedge-shaped fins which are to be inserted into the split portions of the coupling in the manner and for the purpose hereafter more fully described.

Referring more particularly to the drawings, in which similar reference characters identify similar parts in the several views, a complete mast 16, only four full sections of which are shown in Fig. 1, may be erected by utilizing a plurality of sections of hollow tube and the various embodiments of my novel coupling, until there is produced a mast of between 70 and 80 feet and containing as many as 7 sections of approximately 11 feet in length, with guy wires 17 holding the mast in erected position by connecting the guy wires to posts or other securing means disposed about the base of the mast. For the purposes of illustration, I have shown the two bottom sections of such mast constituted of hollow tubes of equal diameter, the second and third sections, from the ground up, being hollow tubes of different diameter. The third and fourth hollow tube sections are again of the same diameter and this sequence of alternating adjacent sections of different and the same diameters may be followed throughout the length of the mast. Wherever guy wires 17 are to be used, the coupling is provided with a narrow band having guy wire or stay rings attached thereto.

Referring now specifically to the construction illustrated in Figs. 2 and 3, which may be taken to illustrate the adjoining portions of two adjacent sections of hollow tubing like the two bottom sections of the mast of Fig. 1, the hollow tubings are fabricated from laminated sheets of plywood formed into hollow cylindrical form in accordance with a process constituting no part of my invention. The hollow tubing 18 is provided with two vertically spaced apertures 19 through which are adapted to extend plugs or dowel pins 20 which are secured within an elongated key 21. The key 21 on the side provided with the plugs or dowel pins 20 has an arcuate surface corresponding to the curvature of the interior surface of the tube 18. The lower end of the key is bevelled toward the axis of the hollow tube, and the face of the plane or bevel thus formed is sheathed with a strip of sheet iron 22 to present a durable surface. The sheathing of sheet iron is secured to the key by screws 23.

The key 21 corresponds in dimensions to, but is somewhat shorter than the keyway 24 provided in the peripheral surface of the coupling body 25. The coupling comprises a cylindrical length of laminated or solid wood having a narrow band 26 constituting an extension of the cylinder at approximately its center, the narrow band being of a thickness equal to the thickness of the wall of the tube to be coupled. This narrow band is faced with a metal band 27 extending both downwardly and upwardly over the ends of the tubes to be connected to the metal band, the metal band being secured to the narrow wood band 26 and to the coupling body 25 by screws 28.

It will be noted that the narrow wood band 26 is bevelled along its top and bottom peripheral surface with a corresponding bevelling in the opposite direction of the ends of the hollow tube sections, the thus bevelled ends of the collar or band section 26 and the correspondingly bevelled ends of the hollow mast section producing a firm and rigid connection between these structural parts.

The upper hollow tube section 29 is provided with a key, detachably secured to the interior surface of the hollow tube section, of substantially the same construction as described with respect to the key of the bottom or lower hollow tube section but it is positioned diametrically opposite the key of the lower hollow tube section.

Holes 30 are drilled through the wood coupling 25 near the upper and lower extremities thereof, the holes extending at right angles to the axis of the coupling and at points directly in the center of the width of the keyways 24. The holes are drilled at a distance from the center band of the coupling which distance is such that the holes will be opposite the bevel 22 of each of the keys 21 when the coupling is fully inserted into the hollow tubes. Into these holes 30 are inserted internally threaded metal sleeves 31, the internal threading thereof receiving set screws 32.

Corresponding holes 33 are drilled in the wall of each of the tubular sections 18 and 29 to permit the insertion thereinto of a screw-driver to reach the slotted end of the set screws 32 when the coupling is in place within the tubular sections.

The coupling 25 through each of its end sections towards its center and to an extent approximately two-thirds of their length is split by saw cuts as shown at 34, and more specifically in Figs. 3 and 11. The purpose of splitting these portions of the coupling is to have the wedge-shaped fins 35 of the metal sleeve 31 driven within the slit when the sleeve is positioned in the coupling and by means of such wedge-shaped fins expand the slit sections of the coupling against the interior surface of the tubular mast sections. The fins 35 upon the metal sleeves 31 also prevent the turning of the sleeves when they are drawn inwardly by the screw bolts 32.

In coupling together the two adjacent sections of the hollow tubing for erecting the mast, the following procedure is carried out:

The wood cylindrical coupling 25 is inserted into the upper portion of the hollow tube section 18 until the upper edge of the tube meets the extended center band 26 of the coupling. This operation brings the set screw 32 directly opposite the bevelled and metal sheathed end 22 of the key 21. By turning the set screw home, so that it tightens against the bevelled metal sheath 22, a two-way locking action is secured. This lateral thrust of this screw 32 jams the cylindrical coupling against the inside wall of the tube and the sliding end thrust of the set screw against the bevel plane of the key 21 forces the end of the tube upwardly against the center band of the coupling, locking the tube firmly to the latter.

The upper hollow tubing 29 is similarly positioned over the upwardly extending section of the coupling with the lower end of the tube abutting the extended and bevelled surface of the center band of the coupling. It is to be noted that the metal band 27 surrounding the wood center band coupling extends beyond such band and overlies the upper and lower extremities of the adjacent tube sections. The connection of the upper hollow tubing 29 to the coupling is effected in the same manner as just described, by means of set screw 32 being screwed tight against the upper bevelled end of the upper key 21.

In this embodiment of my invention, I have illustrated the keys 21 as removable from their position within the hollow tube sections 18 and 29, so that upon removal of such keys by pressing the plugs or dowel pins out of the apertures 19, the interior surface of the hollow tube section may be left unobstructed for the purpose of receiving a narrower diameter tube section in a nesting relationship. In this manner, a small section of hollow tubing may be conveniently positioned for transportation into a larger tube section.

The embodiment of the coupling device illustrated in Figs. 6 and 7, which may be utilized for connecting two hollow tube sections of the same diameter, for instance, the fourth and fifth section of the mast illustrated in Fig. 1, is substantially similar to the construction illustrated in Figs. 2 and 3 with the following minor exceptions: The wood band 36 having the effect of increasing the diameter of the wood coupling at its center, instead of having a metal band secured to the coupling by the screws 28 of the embodiment of Figs. 2 and 3, is provided with a metal band having guy wire or stay rings 37 which may be four in number, extending from the coupling in four directions. Such stay rings may be formed integrally with the metal band 38.

The embodiment of my invention as illustrated in Figs. 6 and 7 differs further from that of Figs. 2 and 3 in that the keys are permanently secured to the interior surfaces of the hollow tubes 18 and 29 by screws 39. This fixed key construction can be used for the hollow tube of smaller diameter, which can be nested into the larger tubes of larger diameter. Otherwise the construction of Figs. 6 and 7 is substantially the same in operation and assembly of the adjoining tube sections as that of the previously described embodiment.

Returning now to the embodiment of my invention illustrated in Figs. 4 and 5, in this construction, the coupling is used to connect two adjacent sections of hollow tubing which are of different diameters. The coupling of this embodiment is that used, for instance, in joining the second and third sections from the bottom of the mast illustrated in Fig. 1. In such embodiment, the configuration of the coupling used is that illustrated in perspective in Fig. 11, from which it will be seen that the coupling, although integral, comprises two sections, one of large diameter, and the other of smaller diameter, corresponding substantially to the interior diameters of the two hollow tube sections to be joined together.

In this embodiment however, the larger diameter tube section is first capped with a metal flanged ring or plate 40 from which extend guy wire or stay rings 41, and which plate has an inwardly extending flange 42 adapted to seat upon the upper extremity of the lower tube section 43. The plate is bevelled, as at 44, along its inner periphery to receive the correspondingly bevelled circular lower extremity of the upper tube section 45.

The upper tube section 45 and the manner of its securement to the coupling 46, as well as the key, keyway, and set screw arrangement therefor, are the same a previously described with respect to the joining of the tube sections of Fig. 6.

In the particular embodiment illustrated in Figs. 4 and 5, the securement of the coupling to the lower tube section, or vice versa, is different from that previously described in that preferably two wedge-shaped sleeves 31 and screws 32 are used. These sleeves and screws extend through two apertures 33 in the hollow tube section. The use of two such sleeves with wedge-shaped fin necessitate a slight difference in the construction of the key for this portion of the coupling. Such key is illustrated in perspective view in Fig. 14 and comprises a block of wood 47 having the plugs or dowel pins 20 and at one end thereof and the sheathing 22 of metal over its bevelled extremity. At the other end of the key there is provided a sheathing strip 48 of metal which extends over the end of the key, and also along the portion of the side near the upper extremity of the key, the strip being secured to the key by a pair of screws.

Nearly midway the length of the key 47 and opposite the upper of the two sleeves and set screws of the lower tube section, the key is provided with a recess 49, lined with a metal sheathing strip 50 against which the set screw opposite the recess is adapted to abut to exert a second lateral thrust as well as an end thrust against the interior surface of the lower tube section to which it is joined. It has been found in practice that the use of two such thrust screws considerably increases the rigidity of the assembled mast sections, and I have therefore illustrated this embodiment of my invention as utilizing two such sleeves and threaded screws to provide the additional lateral and end thrust against the key.

It will be noted that in this embodiment, as well as in the two other embodiments of my coupling, the coupling is saw-cut from its extremities to approximately two-thirds of the length of such coupling from each end thereof. The sleeves 31, by means of the wedge-shaped fins extending therefrom, will be effective to force the thus saw-cut sections of the coupling apart and force the interior surfaces thereof against the interior surfaces of the hollow tube sections which are joined by the coupling.

It is to be understood that the illustration of the detachable keys on the large diameter mast sections is made principally to permit the nesting or clustering of the smaller diameter upper mast sections within the larger daimeter base sections.

The assembling of two adjacent tube mast sections utilizing the coupling of the just described embodiment of my invention is accomplished in the same manner as the connection and coupling of the embodiment heretofore described.

It should be noted that the diameter of the coupling is such as to achieve a close sliding fit with the inside of the tube to be coupled. Any disparity between the external diameter of the coupling and the internal diameter of the tube sections surrounding it, is effectively overcome by the utilization of the wedge-shaped fins prying the saw-cut portions of the coupling apart. The length of the coupling is made such as to be sufficient to provide a bearing to meet the stresses involved. I have found that for connecting hollow tubular sections approximately 11 feet in length, the coupling should be about 2 feet in length.

While I have described specific embodiments of my invention, it is obvious that various changes in the particular configuration and disposition of the structural elements may be made without departing from my invention. For instance, the center collar sections of the coupling, instead of being connected with the coupling or forming an integral part thereof, may be cut from one of the hollow mast members.

I claim:

1. In combination with a coupling for uniting two hollow tube sections longitudinally, said coupling comprising a cylindrical body having approximately at the center thereof a band of larger diameter than the cylindrical body, for receiving the ends of the hollow tube sections in abutting relation within such band, said cylindrical body having keyways cut therein and extending from each end of the cylindrical body toward its center, keys secured to the interior surfaces of the hollow tube sections to be joined together, and extending into the said keyways and means extending laterally through said cylindrical body for joining the hollow tube sections to the coupling.

2. In combination with a coupling for securing the positive union of two hollow tube sections, said coupling comprising a cylindrical body, a collar located on said cylindrical body at a point about the center of its longitudinal dimension, for receiving the ends of the hollow tube sections in abutting relation within said collar, said cylindrical body having keyways cut therein in diametrically opposed positions in its periphery and extending from each end of the cylindrical body, toward its center, keys secured to the interior surfaces of the hollow tube sections to be joined together, and extending into the said keyways and means extending laterally through said cylindrical body for joining the hollow tube sections to the coupling.

3. A coupling for securing the positive union of two hollow tube sections, which comprises a cylindrical body having approximately at the center thereof a band of larger diameter than the cylindrical body for receiving the ends of the hollow tubes in abutting relation within such band, said cylindrical body having keyways cut therein in diametrically opposed position in its periphery and extending from each end of the cylindrical body toward its center, keys received in said keyways and secured to the interior surfaces of the hollow tube sections to be joined together, and means extending laterally through said cylindrical body and into said keyways abutting the ends of said keys, for joining the hollow tube sections to the cylindrical body, said body being slit from its ends toward the center to a distance approximately two-thirds of the length of said keyways, said means being effective to pry the slit portions of the cylindrical body apart and against the interior surfaces of the hollow tube sections.

4. A coupling for securing the positive union of two hollow tube sections which comprises a cylindrical body having approximately at the center thereof a band of larger diameter than the cylindrical body for receiving the ends of the hollow tubes in abutting relation with such band, said cylindrical body having keyways cut therein in diametrically opposed positions in its periphery and extending from each end of the cylindrical body toward its center, keys received in said keyways and secured to the interior surfaces of the hollow tube sections to be joined together, and means extending laterally through said cylindrical body for joining the hollow tube sections to the cylindrical body, said means being constituted of an internally threaded sleeve having a screw threaded therein, the end of which screw is adapted to abut the key on the hollow tube section.

5. A coupling for securing the positive union of two hollow tube sections, which comprises a cylindrical body having approximately at the center thereof a band of larger diameter than the cylindrical body, for receiving the ends of the hollow tubes in abutting relation within said band, said cylindrical body having keyways cut therein and extending from each end of the cylindrical body toward its center, keys received in said keyways, said keys having bevelled metal-sheathed end surfaces and being secured to the interior surfaces of the hollow tube sections to be joined together, and means extending laterally into said keyways and abutting the bevelled metal-sheathed end surfaces of the keys, for joining the hollow tube sections to the cylindrical body with a two-way thrust, said body being saw-cut from its ends toward the center to a distance approximately two-thirds of the length of said keyways, said saw-cut extending across the width of the cylindrical body, and said means for securing the cylindrical body to the hollow tubes being constituted of an internally threaded sleeve having a screw threaded therein the end of which screw is adapted to abut the key on the hollow tube sections, said sleeve having two diametrically opposite wedge-shaped fins for prying the saw-cut sections of the cylindrical body apart and against the interior surfaces of the hollow tube sections.

6. A coupling for securing the positive union of two hollow tube sections, which comprises a cylindrical body having approximately at the center thereof a band of larger diameter than the cylindrical body, for receiving the ends of the hollow tubes in abutting relation within said band, the end portions of said cylindrical body being split across the width thereof, and means constituted of a sleeve extending into the cylindrical body at the slit and having two diametrically opposite wedge-shaped fins for prying the split sections of the cylindrical body apart and against the interior surfaces of the hollow tube sections.

7. A coupling construction for joining two hollow tube sections, which comprises a body of cylindrical form having a pair of diametrically opposed keyways, a pair of keys secured to the interior surfaces of the hollow tube sections to be joined together, and means for exerting pressure against the ends of such keys when positioned within the keyways to produce a lateral and end thrust between the cylindrical body and the hollow tube sections.

8. A coupling for positively joining two hollow tube sections of unequal diameters comprising a solid cylindrical member having two portions of different diameters corresponding to the interior diameters of the tube sections to be joined together, adapted to be inserted into the adjoining portions of two hollow tube sections, and means for exerting an end thrust between the coupling and adjoining hollow tube sections, the lower circular end section of the upper hollow tube being bevelled, and said coupling including a metal flanged ring positioned over the upper extremity of the larger hollow tube section, said metal flanged ring having its inner periphery bevelled to receive the said bevelled lower circular end section of the upper hollow tube.

9. In a coupling construction for joining two hollow tube sections as claimed in claim 7, means for detachably securing the keys to the interior surfaces of the hollow tube sections.

10. In a coupling construction as claimed in claim 4, an auxiliary means for enhancing the lateral and end thrust engagement of the cylindrical body to the hollow tube sections, said auxiliary means comprising a threaded sleeve member and screw positioned intermediate the ends of the key attached to the hollow tube section and of the corresponding keyway provided in the coupling body.

11. In a coupling construction for joining together two hollow tube sections, as claimed in claim 1, a metal flange integral with the central band of the cylindrical body and extending beyond said central band so as to overlap the adjacent end surfaces of the joined hollow tubes.

GEORGE W. ANDERSON.